(12) United States Patent
Cole et al.

(10) Patent No.: US 8,276,810 B2
(45) Date of Patent: *Oct. 2, 2012

(54) CHANGE ORDERS

(75) Inventors: Kevin Cole, Charlotte, NC (US); Wanda P. Wick, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 677 days.

This patent is subject to a terminal disclaimer.

(21) Appl. No.: 12/349,574

(22) Filed: Jan. 7, 2009

(65) Prior Publication Data

US 2010/0174640 A1 Jul. 8, 2010

(51) Int. Cl.
*G06Q 40/00* (2006.01)

(52) U.S. Cl. ........ 235/379; 382/135; 382/137; 235/385; 705/35

(58) Field of Classification Search .................. 235/379; 382/135, 137; 705/35
See application file for complete search history.

(56) References Cited

U.S. PATENT DOCUMENTS

| | | | |
|---|---|---|---|
| 6,363,164 B1 * | 3/2002 | Jones et al. | 382/135 |
| 6,715,670 B1 * | 4/2004 | Swiatek et al. | 235/379 |
| 6,848,612 B2 | 2/2005 | Uematsu et al. | |
| 6,983,836 B2 | 1/2006 | Adams et al. | |
| 2001/0020638 A1 | 9/2001 | Uematsu et al. | |
| 2001/0054643 A1 | 12/2001 | Siemens | |
| 2003/0083969 A1 | 5/2003 | Uchiyama et al. | |
| 2003/0236589 A1 | 12/2003 | Myatt | |
| 2004/0069591 A1 | 4/2004 | Ito | |
| 2005/0080731 A1 | 4/2005 | Snyaneshwar | |
| 2005/0096986 A1 | 5/2005 | Taylor et al. | |
| 2005/0108164 A1 | 5/2005 | Salafia et al. | |
| 2005/0284728 A1 | 12/2005 | Corrick et al. | |
| 2006/0022032 A1 | 2/2006 | Fillinger et al. | |
| 2007/0045395 A1 | 3/2007 | Corona et al. | |
| 2007/0063016 A1 | 3/2007 | Myatt et al. | |
| 2009/0001158 A1 | 1/2009 | Walters | |

FOREIGN PATENT DOCUMENTS

| | | |
|---|---|---|
| EP | 1486923 | 12/2004 |
| WO | 2005038623 | 4/2005 |

OTHER PUBLICATIONS

International Search Report and Written Opinion for International Application No. PCT/US2007/088650, Mailed Sep. 16, 2008, 10 pages.
International Search Report dated Jan. 7, 2010.

* cited by examiner

*Primary Examiner* — Daniel Felten
(74) *Attorney, Agent, or Firm* — Banner & Witcoff, Ltd.; Michael A. Springs

(57) ABSTRACT

Method, apparatus and system for setting up withdrawal change orders online or at a cash handling device for immediately retrieval and/or future retrievals of paper cash and coin. The change order may include specific requested denominations of paper cash and/or coins. The change order may also include a specific location that the user wishes to retrieve the cash at. Upon authentication of the user at the requested cash handling device within the time-frame specified, the user may receive the change order requested automatically.

17 Claims, 10 Drawing Sheets

FIG. 10

| Device ID | Location | Type | Available Funds | $20 bills | $10 bills | ... | $0.25 Quarters | $0.10 Dimes |
|---|---|---|---|---|---|---|---|---|
| 100001 | 321 abc street, Washington, DC | ATM | $3,026.83 | 100 | 20 | | 100 | 83 |

CHANGE ORDERS

FIELD OF THE INVENTION

Aspects of the disclosure relate to cash handling. More specifically, aspects of the invention relate to the deposit of money and the withdrawal of money.

BACKGROUND

Cash flow includes the movement of cash over a particular time period within a business or enterprise. The calculation of cash flow may be used as one measure to gauge financial health of the business. Managers in charge of cash flow management may use various tools to assist in making decisions involving cash flow.

Businesses and other organizations often require a supply of cash to fund transactions such as providing change for customer purchases. Based on the transactions that take place, the business or organizations may become depleted in one or more denominations of paper or coin money and may have a surplus in other denominations. As such, the business or organization may request a change order to obtain money in the desired denominations and may deposit the unneeded surplus denominations.

Multiple businesses, for example, such as in a shopping mall may each desire to have change orders prepared to stock each cash register for the next day's business. However, within a mall, there may be a limited supply of cash handling devices to serve the businesses and customers. Even if there are numerous cash handling devices, a business might not know which of the cash handling devices has enough cash to fulfill a change order. Searching for a cash handling device with enough change to fulfill a requested order is inefficient.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

In one aspect, a user may set-up withdrawal change orders online or at a cash handling device for immediate retrieval and/or future retrievals of paper cash and/or coins. The change order may include specific requested denominations of paper cash and/or coins. The change order may also include a specific location at which the user wishes to retrieve the cash. Upon authentication of the user at the requested cash handling device within the time-frame specified, the user may receive the change order requested automatically and the user's account may be debited accordingly.

In another aspect, a banking interface device may determine if the requested cash handling device has at the time of request the specific denominations requested. If so, the denominations of cash may be reserved if the retrieval time is within a pre-determined number of hours. Alternatively, the banking interface device may determine whether the cash handling device is scheduled to contain the specific denominations requested and may reserve the specific denominations at the appropriate time. In the event that the requested device does not have the requested denominations and/or is not scheduled to have the requested denominations available at the time requested, the banking interface device may suggest an alternative denominations breakdown and/or may determine a different, but close-by cash handling device with the requested denominations.

BRIEF DESCRIPTION OF THE DRAWINGS

The present disclosure is illustrated by way of example and not limited in the accompanying figures in which like reference numerals indicate similar elements.

FIG. 10 illustrates an example of a record in accordance with one or more aspects described herein.

DETAILED DESCRIPTION

In accordance with various aspects of the disclosure, systems and methods are illustrated for providing currency handling services and management. A financial institution such as a bank may provide immediate access and use of funds recently deposited using the currency handling apparatus, system, and method described below in various aspects. For illustrative purposes the financial instrument discussed throughout the below description is cash. However, as those skilled in the art will realize, the described aspects of the invention are not limited to just cash (paper money and coins) and but may also include other forms of liquid assets such as checks, bank notes, and money orders.

Figure 1:
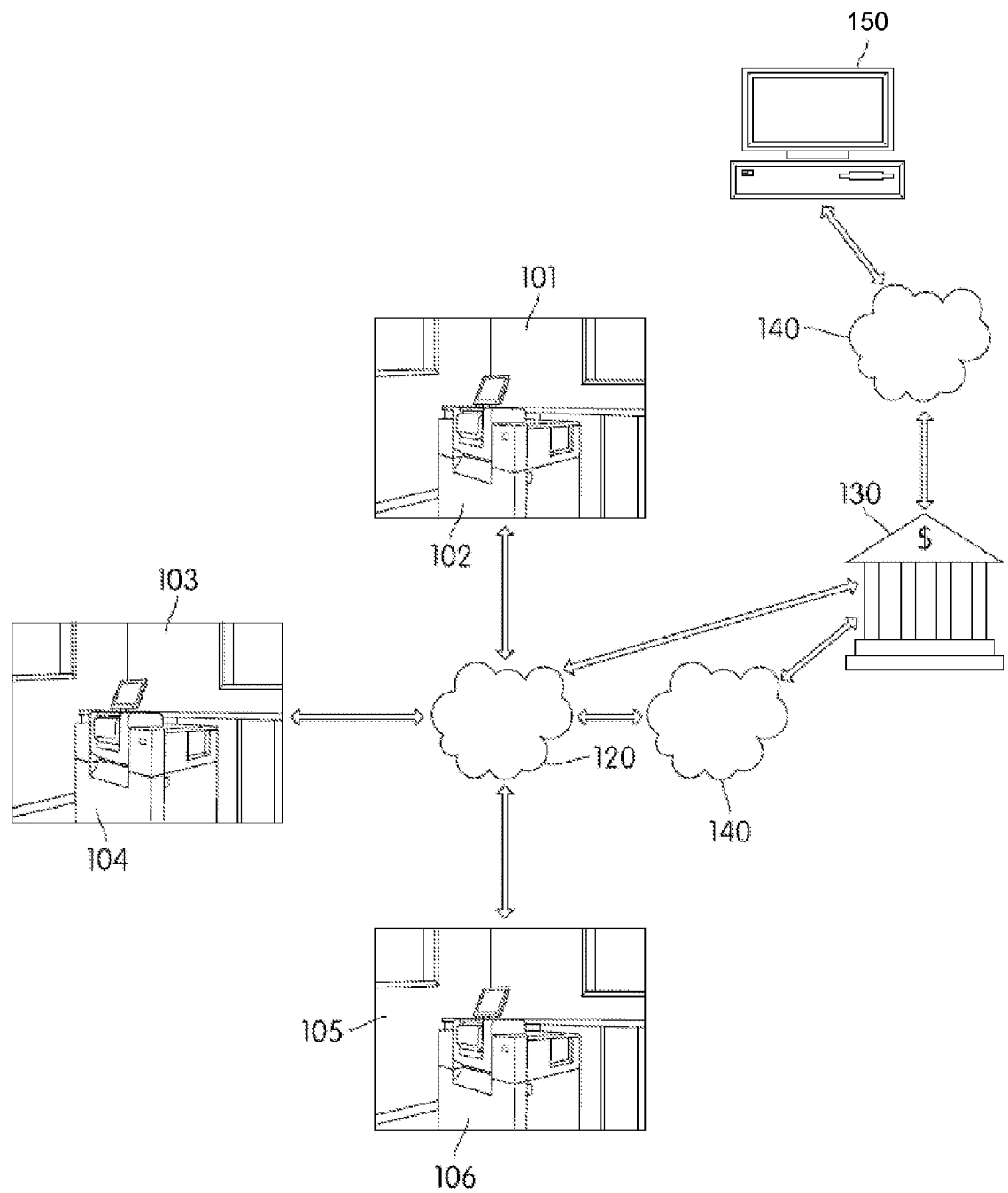
FIG. 1 illustrates an example of a suitable operating environment in which various aspects of the disclosure may be implemented.

FIG. 1 illustrates an example of a suitable operating environment in which various aspects of the disclosure may be implemented. Cash handling devices which allow for withdrawal and/or depositing of cash and other forms of liquid assets may also include currency or cash recycling functionality which allows, for example, a particular $5 bill deposited into the machine by one user to be retrieved and re-circulated into the market by the same or different user upon withdrawal. Cash handling devices with cash recycling functionality may include but are not limited to automated teller machines (ATMs), self-service payment cash handlers, and the like.

Cash handling devices 102, 104, 106 may be located at various locations such as locations 101, 103, and 105. The locations may represent different stores of a business enterprise. For example, locations 101, 103, and 105 may represent three different grocery stores located in different geographical areas belonging to a grocery chain. Those skilled in the art will realize that additional cash handling devices may be located in same stores or in other stores belonging to the grocery chain. In addition, those skilled in the art will realize that a grocery chain is only one illustrative example of the types of locations that cash handling devices may be located. For example, cash handing devices may also be located in gas stations, post offices, department stores, and other places where cash and other financial instruments are deposited or withdrawn.

FIG. 1 further illustrates that cash handling devices 102, 104, and 106 may be connected to a communications network such as communications network 120. Communications network 120 may represent: 1) a local area network (LAN); 2) a simple point-to-point network (such as direct modem-to-modem connection); and/or 3) a wide area network (WAN), including the Internet and other commercial based network services.

Cash handling devices 102, 104, and 106 may communicate with one another or with a financial institution such as bank 130 via communication network 120 in ways that are well known in the art. The existence of any of various well-known protocols, such as TCP/IP, Ethernet, FTP, HTTP, BLUETOOTH, Wi-Fi, ultra wide band (UWB), low power radio frequency (LPRF), radio frequency identification (RFID), infrared communication, IrDA, third-generation (3G) cellular data communications, Global System for Mobile communications (GSM), or other wireless communication networks or the like may be used as the communications protocol. Communications network 120 may be directly connected to a financial institution such as bank 130. In another embodiment, communications network 120 may be connected to a second network or series of networks 140 such as the STAR network before being connected to bank 130.

Figure 2:
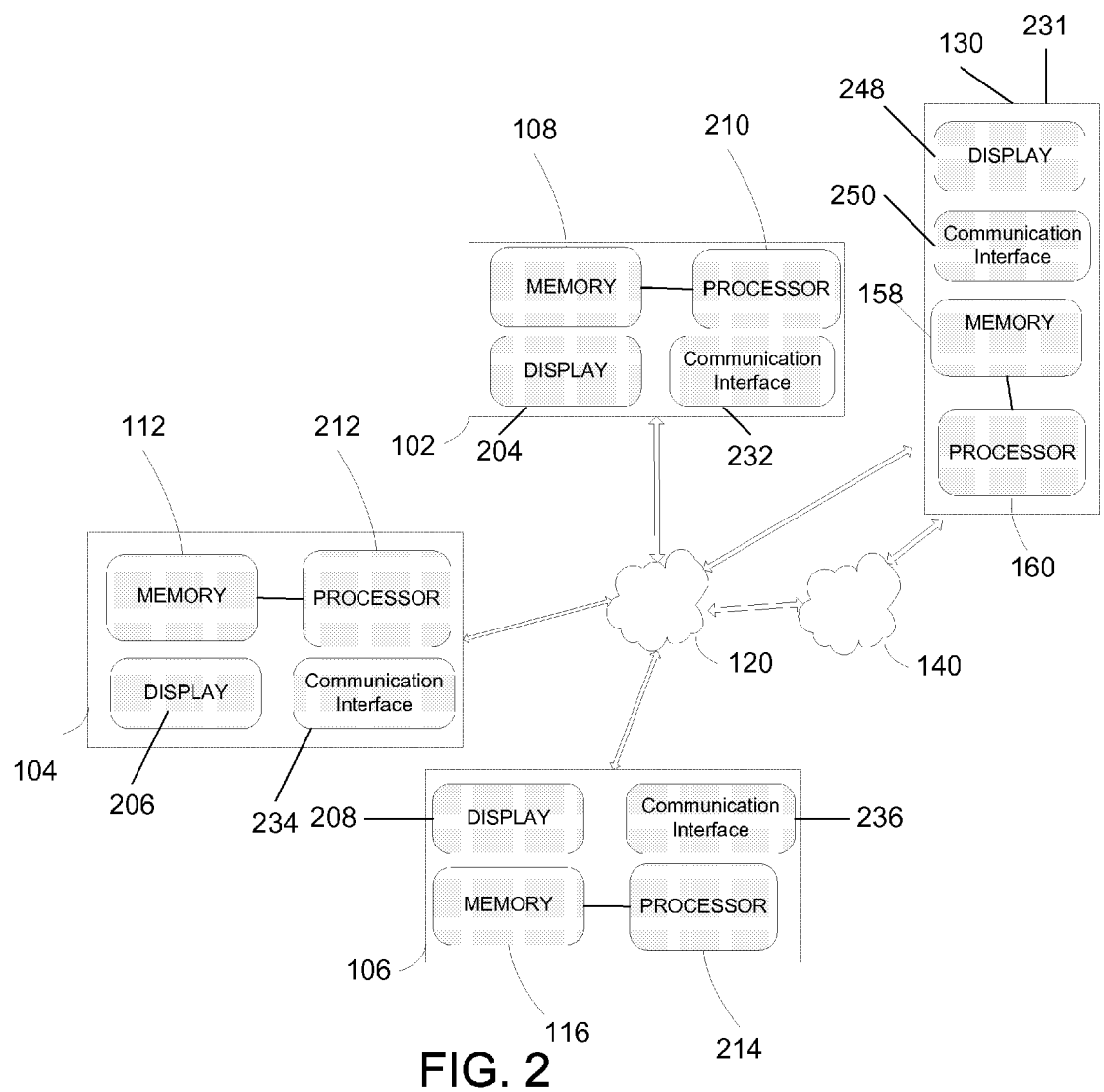
FIG. 2 illustrates a simplified diagram of a cash handling device in accordance with one or more aspects described herein.

FIG. 2 illustrates a simplified diagram of a cash handing device in accordance with an aspect of the invention. Cash handing devices may comprise memories (108, 112, and 116) processors (210, 212, and 214), displays (204, 206, and 208), and communication interfaces (232, 234, and 236). The processors 210, 212, and 214 may execute computer-executable instructions present in memory 108, 112, 116 such that, for example, the cash handing devices 102, 104, and 106 may send and receive information to and from bank 130 via network or networks 120 and/or 140. Bank 130 may utilize an infrastructure which includes a server 231 having components such as memory 158, processor 160, display 248, and communication interface 250. The memory for each of the cash handling devices 102, 104, and 106 and server 231 may include non-volatile and/or volatile memory.

Figure 3:
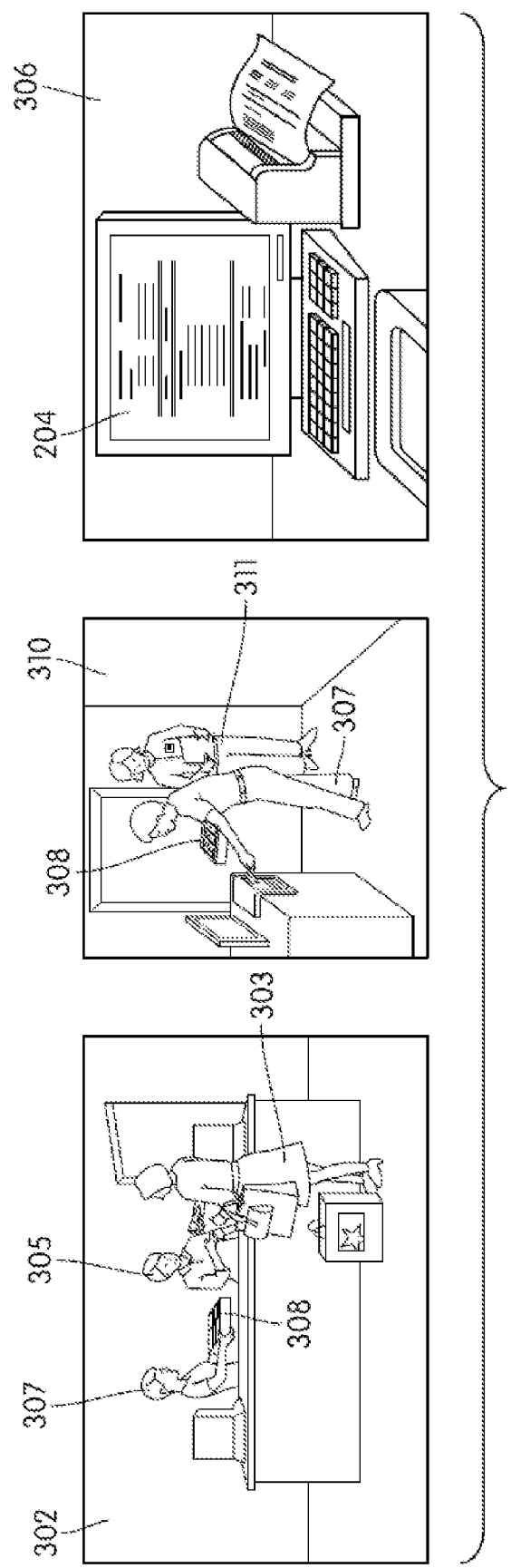
FIG. 3 illustrates various features of a cash handling device in accordance with one or more aspects described herein.

FIG. 3 illustrates various features of cash handling devices 102 used in various aspects of the invention. The images in FIG. 3 depict use of a single cash handing device 102 in a retail environment. The retail owner may have a cash handing device 102 located in each of their stores. In an aspect of the invention, summary information for the retail owner's stores may be available via an interface to the financial institution. In another embodiment, access to summary information may be available directly from each of the cash handing devices 102.

In FIG. 3, image 302 depicts customer 303 paying cash to store cashier 305 for a purchase. Another store cashier 307 at a recently closed cash register may be carrying a cash drawer or till 308 to a back office for reconciliation. In image 310, store cashier 307 may load currency from cash register till 308 into cash handing device 102. In addition, store cashier 107 may also deposit other paper forms of payment received from customer such as checks. An office manager 311 may be supervising cashier 307 during the loading of cash register till 308 into cash handing device 102. Moreover, upon the start of a shift a cashier may fill his/her cash register till with a designated amount of currency dispensed from cash handing device 102.

In image 306 of FIG. 3, a display screen 204 of cash handing device 102 may show the total amount entered into cash handing device 102 from till 308. The display screen 204 may breakout the amount entered into cash handing device 102 by denomination and by each cashier. The total amount deposited and withdrawn from cash handing device 102 may be shown on display screen 204.

Figure 4:
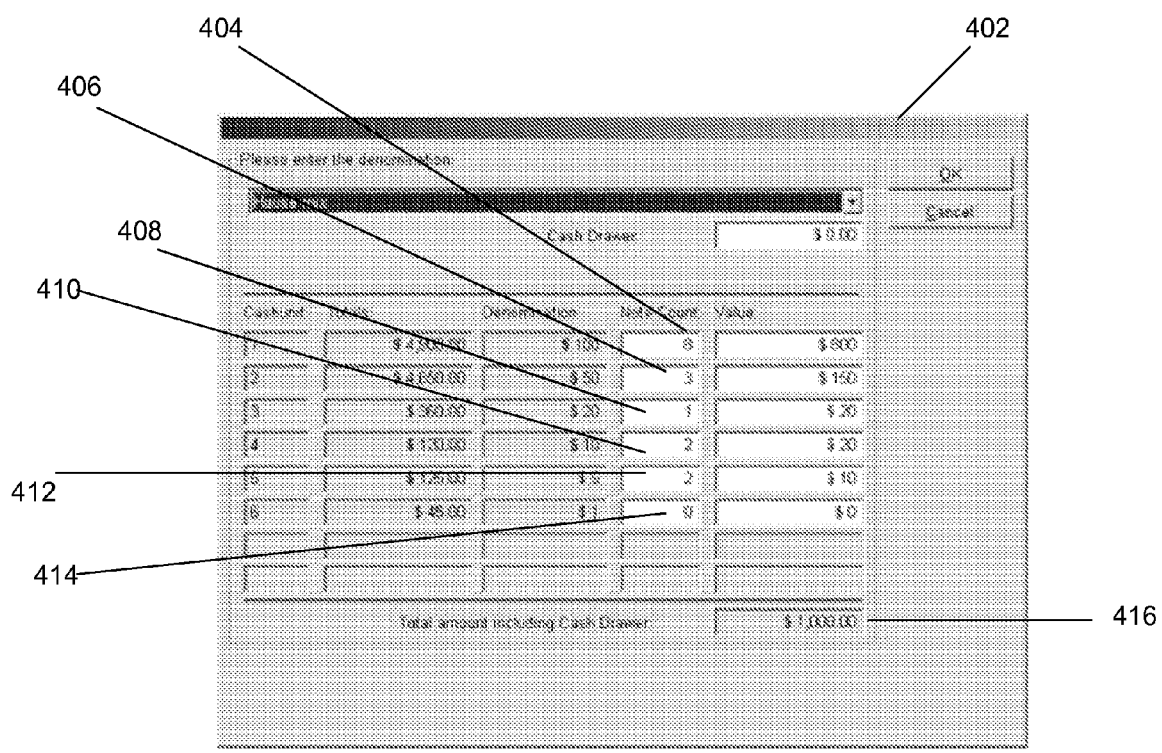
FIG. 4 illustrates a withdrawal interface in accordance with one or more aspects described herein.

FIG. 4 illustrates a method to withdraw a change order, for example, to fill a cash register till. A withdrawal screen 402 may be presented to the user in accordance with an aspect of the invention. The user, through a series of dropdown boxes, may request that a certain total amount be withdrawn from the cash handing device in requested denominations. For example in screen 402, the user has requested that a total of $1,000 U.S. dollars 416 be withdrawn from cash handing device 102. The user has further requested that the cash handing device 102 dispense the $1,000.75 dollars in the form of eight $100 dollar bills (404), three $50 dollar bills (406), one $20 dollar bill (408), two $10 dollar bills (410) and two $5 dollar bills (412) and three quarters (414). Upon entry of the appropriate amount the user may select button 418 or shortcut key F1 to initiate the withdrawal. After the currency has been dispensed by the cash handing device 102, the cash handing device 102 may communicate with the financial institution or bank 130 to debit the appropriate enterprise accounts.

Figure 5:
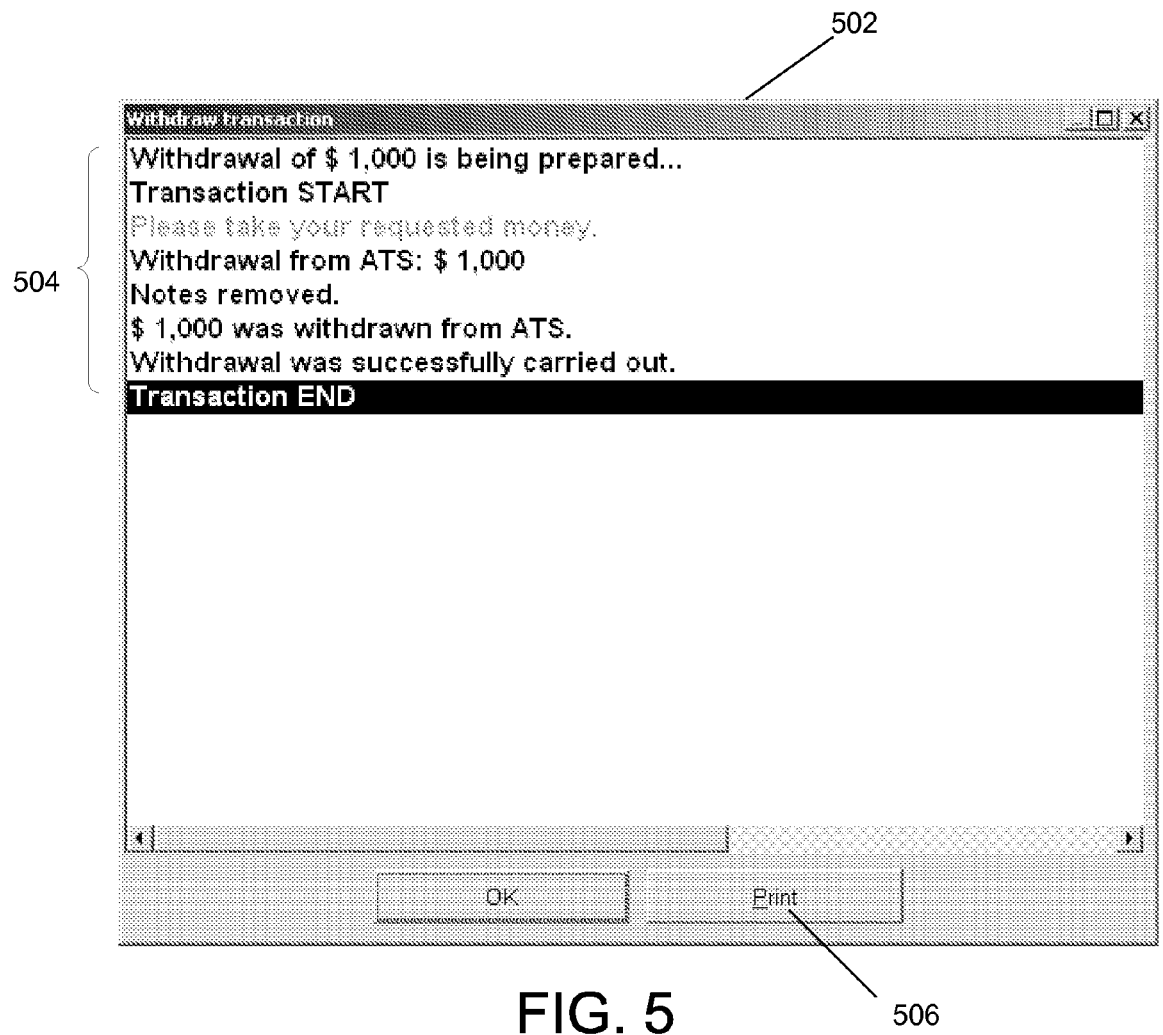
FIG. 5 illustrates a user interface screen in accordance with an aspect of the invention.

When the currency has been dispensed from the cash handing device 102, a displayed receipt may be shown to the user. For example, FIG. 5 illustrates a user interface 502 listing details in the form of receipt 504 for viewing by the user in accordance with an aspect of the invention. The user may request that the displayed receipt be printed 506.

Figure 6:
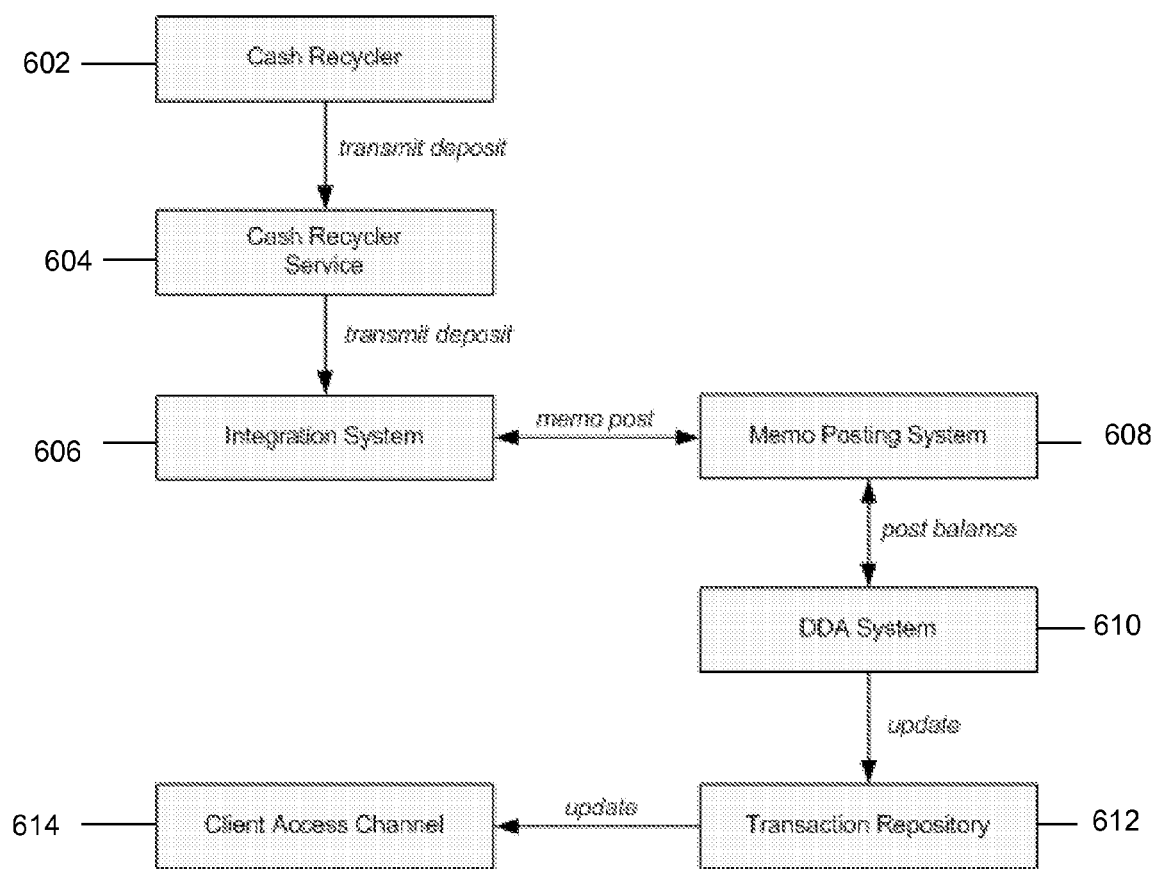
FIG. 6 illustrates a system configuration that may be used in accordance with one or more aspects described herein.

FIG. 6 illustrates a system configuration that may be used in accordance with an aspect of the invention. In FIG. 6, a cash handing device 602, such as a cash recycler, may communicate information to cash recycler service 604 located at a remote location. For example, cash handing device 602 may communicate deposit and withdrawal information from an enterprise location to the remote cash handing device service 604. The information may be routed through various networks such as the Internet to reach the cash handing device service. The cash handing device service 604 may be located in the data center of a financial institution. The cash handing device service 604 may communicate with an integration system 606 which provides access to the financial systems and processes. The integration system 606 may communicate with a memo posting system 608 which may perform posting activity. The posting system 608 may update the appropriate DDA (direct deposit account) system 610 to reflect the balance changes in the enterprises account balances. The DDA system 610 may also update a transaction repository 612 for historical and intra-day reporting purposes. An enterprise employee may access information stored in the transaction repository 612 through a client access channel 614 via web browser. Those skilled in the art will realize that the financial institution may allow the enterprise user to access the information stored in the transaction repository via numerous alternative communication methods.

Cash handling devices and recycling management are further described in U.S. application Ser. No. 11/614,656, entitled "Commercial Currency Handling and Servicing Management," filed on Dec. 21, 2006, the content of which is incorporated herein by reference in its entirety.

Figure 7:
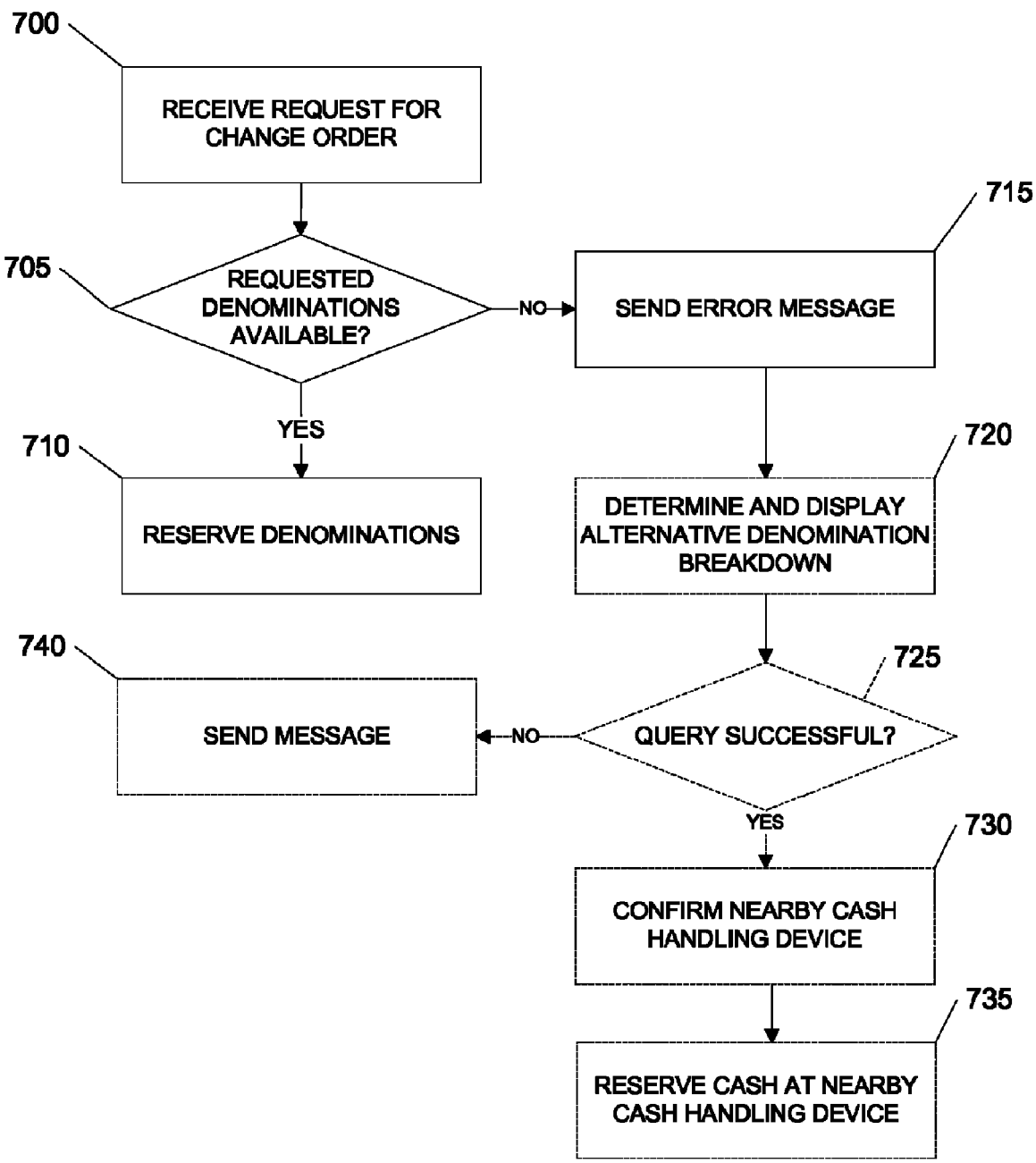
FIG. 7 illustrates a flowchart of a method of receiving a request a withdrawal change order at a banking interface in accordance with one or more aspects described herein.

FIG. 7 illustrates a flowchart of a method of receiving a request a withdrawal change order at a banking interface. A banking interface may include a display and may be part of a cash handling device, online banking website, or any other system that accepts input from a user, displays messages to the user, and communicates with a financial institution's network. The banking interface and other actions may be controlled by a processor or computer. As used herein, the term "banking interface device" may be used to describe a cash handling device and/or a computer or other device displaying and allowing user interaction with an online banking website interchangeably.

At step 700, the interface may receive a request for a change order withdrawal from a user. The request may include specific denominations of cash to be withdrawn and may further include location and time that the request is to be fulfilled at. For example, the user may select a location of an ATM or a cash recycler located inside a grocery store for withdrawal of $200.00 in denominations of twenties, tens, fives, ones, quarters, dimes, nickels and pennies at 7:00 a.m. the next business day so that the change order may be retrieved before the grocery store is open for business. In another aspect, the time slot desired for retrieval of the cash may be configurable to include different times on different days. For example, the time slot may be a span of hours on a particular day or days. The user may input the desired denominations, location, and other input by pressing the number keys or buttons on a keyboard of a cash handling device or a device communicating with the online banking system such as a desktop or laptop computer, mobile communication device, cellular phone, and the like. Alternatively, the user may input the desired denominations, location information, and other input by using a soft keyboard located within the display.

Users may configure requests by selecting from a number of each denomination and may also use constraint indicators such as "at least", "at most", "exactly equal" and the like. For example, the user may indicate that "any combination" of "fives", "tens" and "twenties" amounting to "$100" is acceptable.

At step 705, the banking interface may determine whether the selected cash handling device currently, or is scheduled to contain the denominations requested. For example, the banking interface device may communicate with a central bank server to determine if the selected cash handling device contains the denominations requested. The banking interface device (e.g., cash handling device 102), may send a query to a data store (e.g., server 231), which may contain inventory information including how many denominations of a bill are available in real-time or scheduled to be available at the time slot requested in the change order in a particular cash handling device to determine if the selected cash handling device has the denominations requested. The inventory information may be stored in a memory within the data store (e.g., memory 158 and the results may be transmitted back to the banking interface device.

In one aspect, the data store may be a device that includes a physical mass storage device, such as a hard drive. Alternatively, or in addition, the data store may be located within the banking interface device (e.g., memory 108). An online banking website may similarly query server 231 if the user is setting up change orders online. FIG. 10 illustrates an example of a record within a data store which may be used to determine whether the banking interface device has the denominations requested. The record may include a device identification number, an address, the type of cash handling device, the total amount of cash available for withdrawal cash handling device, the breakdown of the total cash available by denominations. The denominations shown are examples, and one skilled in the art would understand that any denominations possibly stored by the cash handling device may be reflected in the record.

At step 710, if the banking interface device determines that the denominations requested are available, the device may ensure that the cash handling device set aside or reserve the denominations of cash requested for the change order to ensure availability to the user. Such information may be stored in a record as part of a table, database, or a file within, for example, memory 108 of cash handling device 102, as shown in FIG. 1. Reserving cash for dispensing at a cash handling device may include, for example, sending a request with user identification information and the change order and awaiting confirmation that the request was successfully processed and that the requested denominations were successfully reserved. In one aspect, the confirmation may include a specific time or a span of time in which the cash requested may be available for retrieval. In another aspect, reserving cash may include editing information controlling which portion of the cash currently in, or scheduled to be in a cash handling device is available for dispensing. The information may also control which users the cash may be dispensed to. Reserving cash may update the information such that cash (and in the denominations requested) might not be available to other users, but may be available to the designated user upon the user being authenticated at the time slot as requested in the change order. Such information may be stored in, for example, memory 108 of the cash handling device and/or at a bank server (e.g., server 231) and may be in a form of a file, record, or code.

If the cash handling device does not have the desired amount of cash or breakdown of cash desired by the user, the computer may send an error message indicating that the requested amount or breakdown is not available at step 715. For example, the bank interface device may display the error message. The banking interface device may determine and display an amount or breakdown closest to desired levels and request confirmation whether the amount displayed is acceptable at step 720. In one aspect, some users may be flexible denominations of certain bills or coins while requiring an exact or minimum number of other bills or coins. For example, a small business owner may request $300 worth of change, of which at least 100 must be $1 dollar bills because many items in the store cost under $20 dollars and, as such, may require many $1 bills to make proper change for customers. The same business owner may be very flexible with $20 bills as the owner anticipates that very few customers will be needing change over $20 dollars. As such, the business owner may indicate willingness to accept "any" number of $20 bills as long as "100" of the $300 of the requested change is in the form of $1 bills.

The bank interface device may determine that it has 150 $1 bills available, 20 $10 bills, but no $20 bills. As such, bank interface device may display that it has the denominations requested and dispense the cash requested.

In addition or alternatively, if the desired cash handling device for change order withdrawal is not available to dispense the requested denominations, the banking interface device may send a query to a central banking server or computer to determine if another cash handling devices within a predetermined proximity may fulfill the request at step 725. For example, if the user desires to withdraw the cash for the change order from an ATM on the first floor of a shopping mall, but the cash is available at an ATM on the second floor of the shopping mall, the bank interface device may display such information as location details, address, a cash handling device identifier, and the like. If the query results in a successful determination, at step 730, the bank interface device may request input from a user on whether the new, suggested location is acceptable for change order withdrawal. At step 735, the bank interface device may contact the cash handling device to reserve the cash associated with the change order. For example, the bank interface device may contact the bank server with the request and the bank server may contact the cash handling device to make the reservation. Alternatively, the bank interface device may contact the cash handling device directly to make the reservation. If the query was unsuccessful at step 725, then at step 740, the bank interface device may send a message that the query was unsuccessful.

Alternatively or in addition, the banking interface device may allow the user to select an option to authorize the device to send a text message or email if the change order may be fulfilled by the time specified at the location requested. For example, deposits by one or more other users may increase a deficient denomination of cash within the particular cash handling device to a level which allows the requested withdrawal to be fulfilled. Another example may be a cancellation or otherwise non-withdrawal of a change order requested by another user.

Figure 8:
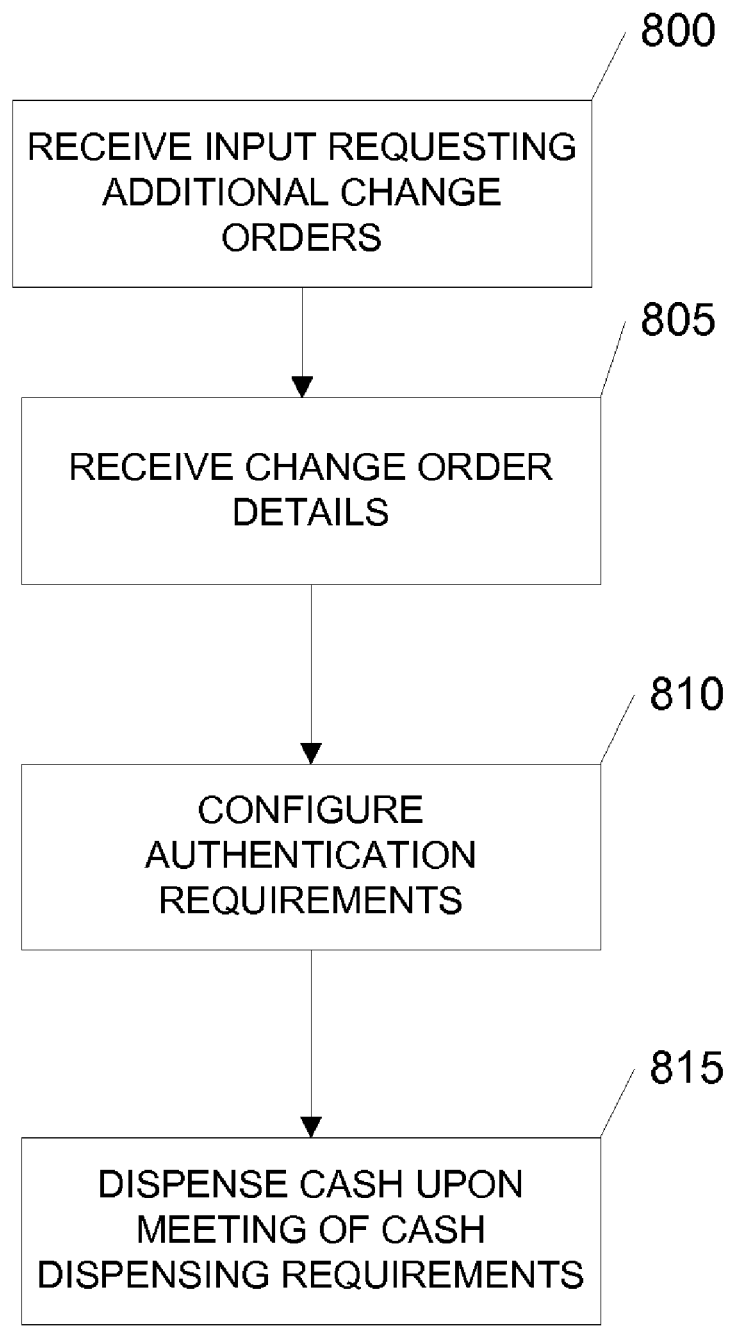
FIG. 8 illustrates a method of scheduling change orders in advance in accordance with one or more aspects described herein.

The bank interface device may record the change order and may associate a name, code, or date with the change order to allow the user to quickly configure a future change order to match the details (location and denominations requested) related to a previously related change order. FIG. 8 illustrates a method of preparing schedule of change orders in advance. At step 800, the bank interface system may receive input that the user is requesting that the change order be repeated on certain days. For instance, the user may desire to withdraw the same change order from the same cash handling device Monday, Tuesday and Wednesday and withdraw a different change order on Thursday and Friday. At step 805, the bank interface system may receive input on which previous change orders the user want repeated and on what future days, times, and location and the like. The user may customize the schedule and may retain certain aspects of previous change orders (denominations selected) while changing other aspects (location).

At step 810 the user may also configure authentication for future change orders. For example, a store manager may set up the future change orders, but desire that the individual cashiers retrieve the change orders before the store opens or before a shift. In this situation, it may be advantageous for the store manager or the bank interface device to send out a text message, email or otherwise communicate a redemption code such that the cashiers may be able to retrieve the cash without a bank card. This may also allow multiple individuals to retrieve cash from the same or different cash handling devices without having to share or utilize a bank card. At step 815, upon authentication, users may receive the specific denominations requested if criteria such as cash handler device location and time requirements are met.

Figure 9:
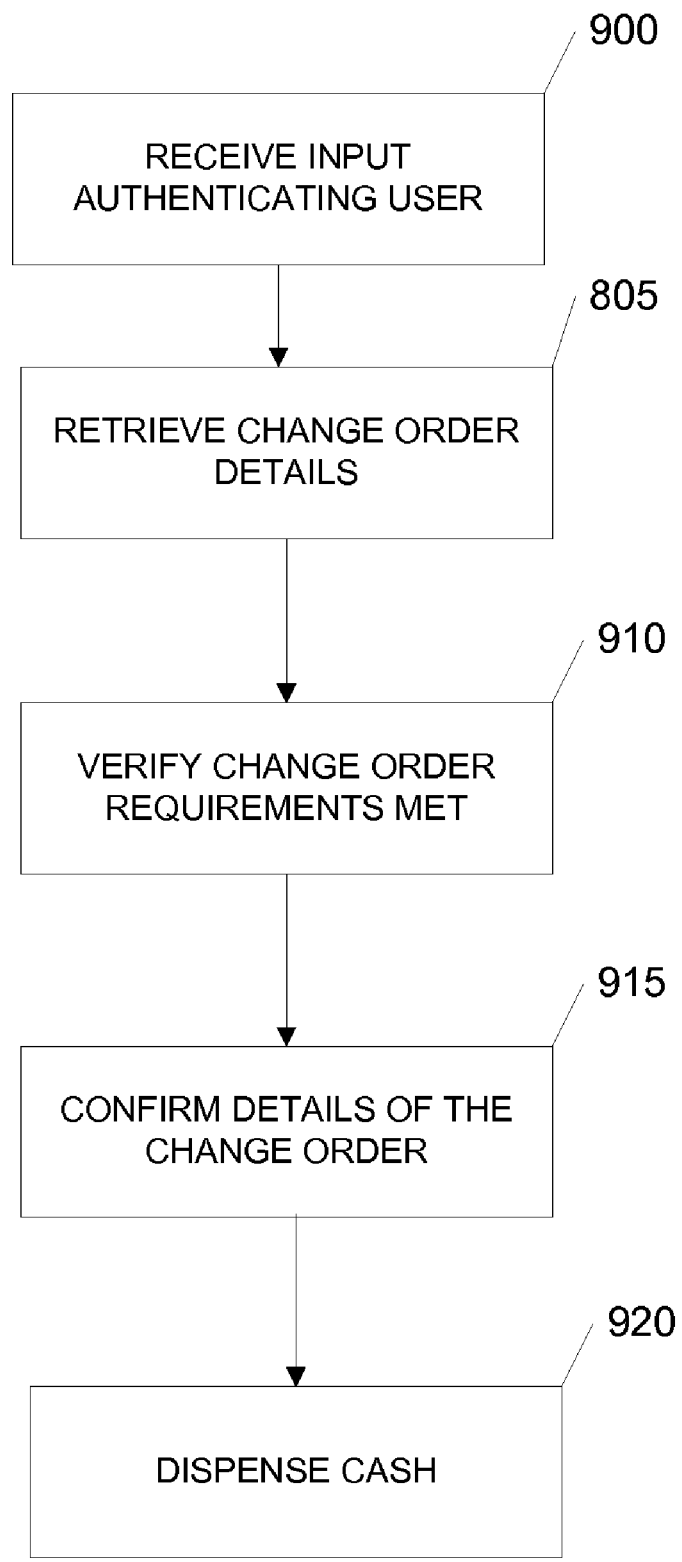
FIG. 9 illustrates a method of retrieving a requested change order in accordance with one or more aspects described herein.

FIG. 9 illustrates a method of retrieving a requested change order. At step 900, the cash handling device may receive input authenticating the user. For example, authentication may include swiping a bank card and providing a personal identification number (PIN), bringing a card or device with a radio frequency identification (RFID) tag within the proximity of a RFID reader, and the like. Upon authentication, the cash handling device may determine that the user has previously set-up a change order and may retrieve the change order at step 905. At step 910, the cash handling device may verify that the requirements of the change order are met. For example, the cash handling device may verify that the user has sufficient funds in the user's account. In another example, the cash handling device may verify that the current time is within the time slot designated in the change order. The cash handling device may request confirmation of the details of the change order at step 915. The user may request change the specific denominations if desired or may confirm the previously set-up denominations. Upon confirmation, the desired cash for the change order may be dispensed at 920 and the user's account may be debited accordingly. In another aspect, the user may edit or otherwise modify the change order any time prior to retrieving the cash.

Although not required, one of ordinary skill in the art will appreciate that various aspects described herein may be embodied as a method, a data processing system, or as a computer-readable medium storing computer-executable instructions. Accordingly, those aspects may take the form of an entirely hardware embodiment, an entirely software embodiment or an embodiment combining software and hardware aspects. In addition, various signals representing data or events as described herein may be transferred between a source and a destination in the form of electromagnetic waves traveling through signal-conducting media such as metal wires, optical fibers, and/or wireless transmission media (e.g., air and/or space).

Aspects of the invention have been described in terms of illustrative embodiments thereof Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

We claim:

1. A method comprising:
   receiving a request for a change order of a specific amount of cash for retrieval at a first cash handling device, wherein the request includes a denomination breakdown requirement for the specific amount of cash;
   querying a data store to determine if the denomination breakdown requested is available at the first cash handling device;
   reserving the cash required to satisfy the change order if the denomination breakdown requested is available at the first cash handling device;
   sending an error message if the denomination breakdown requested is not available at the first cash handling device;
   determining an alternative denomination breakdown for the specific amount of cash if the denomination breakdown requested is not available by querying the data store to determine the available denominations at the first cash handling device and calculating an alternative denomination breakdown equal to the specific amount of cash based on the available denominations at the first cash handling device;
   displaying the alternative breakdown; and
   confirming that the alternative breakdown is acceptable.

2. A method comprising:
   A method comprising:
   receiving a request for a change order of a specific amount of cash for retrieval at a first cash handling device, wherein the request includes a denomination breakdown requirement for the specific amount of cash;
   querying a data store to determine if the denomination breakdown requested is available at the first cash handling device;

reserving the cash required to satisfy the change order if the denomination breakdown requested is available at the first cash handling device;

sending an error message if the denomination breakdown requested is not available at the first cash handling device;

determining whether a second cash handling device within a pre-determined proximity can satisfy the change order including the denomination breakdown requested if the denomination breakdown requested is not available at the first cash handling device by querying the data store to determine if the denomination breakdown requested is available at the second cash handling device;

upon determining that the second cash handling device can satisfy the change order, displaying information that the second cash handling device within the pre-determined proximity can satisfy the change order, wherein the information includes location information; and receiving confirmation that the second cash handling device is preferable.

3. The method of claim 2, wherein the location information includes one of an address, location description, and cash handling device identification information.

4. The method of claim 1, further comprising alerting the user when the denomination breakdown requested becomes available at the first cash handling device, wherein the denomination breakdown requested is not available at the time of the request.

5. The method of claim 4, wherein alerting the user includes one of sending an email to a user-specified email address, calling the user at a user-specified telephone number with an automated message, and sending the user a text message.

6. The method of claim 1, further comprising recording the change order, wherein recording includes saving the denomination breakdown requirement.

7. The method of claim 6, further comprising:
receiving input scheduling of one or more additional change order requests, wherein at least one of the additional change order requests includes selecting a recorded change order.

8. The method of claim 1, further comprising:
receiving input scheduling one more additional change order requests; and
receiving authentication requirements for at least one of the change order requests scheduled.

9. The method of claim 8, wherein the authentication requirements include one of swiping a bank card at the first cash handling device, bringing a RFID tag within proximity of a RFID reader, and inputting a redemption code.

10. The method of claim 9 wherein the authentication requirements include inputting a redemption code, wherein the redemption code is sent to the user retrieving the change order via one of email, a phone call and a text message.

11. The method of claim 1, wherein the change order further includes a time-slot for retrieving the cash.

12. The method of claim 11, wherein reserving the cash comprises:
editing a storage medium containing information controlling availability of cash at the first cash handling device to ensure that the requested cash including the denomination breakdown is available to a user if the user retrieves the cash at the time slot.

13. The method of claim 1, wherein the change order includes at least one denomination of a paper money and one denomination of a coin money.

14. An apparatus comprising:
a processor,
a memory storing instructions that when executed by the processor perform:
receiving a request for a change order of a specific amount of cash for retrieval at a cash handling device, wherein the request includes a denomination breakdown requirement for the specific amount of cash;
after determining that the cash handling device can satisfy the request for the denomination breakdown requested, reserving the cash required to satisfy the change order;
after determining that the cash handling device cannot satisfy the request, sending an message that the cash handling device has insufficient funds and requesting anew denomination breakdown;
upon determining that the cash handling device cannot satisfy the request, determining an alternative denomination breakdown for the specific amount of cash by querying a data store to determine the available denominations at the cash handling device and calculating an alternative denomination breakdown equal to the specific amount of cash based on the available denominations at the cash handling device;
displaying the alternative breakdown; and
requesting confirmation that the alternative breakdown is acceptable.

15. An apparatus comprising:
a processor,
a memory storing instructions that when executed by the processor perform:
receiving a request for a change order of a specific amount of cash for retrieval at a cash handling device, wherein the request includes a denomination breakdown requirement for the specific amount of cash;
after determining that the cash handling device can satisfy the request for the denomination breakdown requested, reserving the cash required to satisfy the change order;
after determining that the cash handling device cannot satisfy the request, sending an message that the cash handling device has insufficient funds and requesting a new denomination breakdown;
determining whether another cash handling device within a pre-determined proximity can satisfy the change order including the denomination breakdown requested if the denomination breakdown requested is not available that the cash handling device by querying a data store to determine if the denomination breakdown requested is available at another cash handling device within a pre-determined proximity;
upon determining that another cash handling device can satisfy the change order, displaying information that another cash handling device within the pre-determined proximity can satisfy the change order, wherein the information includes location information; and
receiving confirmation that the other cash handling device is preferable.

16. One or more computer readable media, that when executed by a processor performs:
receiving a request for a change order of a specific amount of cash for retrieval at a cash handling device, wherein the request includes a denomination breakdown requirement for the specific amount of cash and wherein the change order further includes a time-slot for retrieving the cash;

querying a data store to determine if the denomination breakdown requested is available at the cash handling device;

reserving the cash required to satisfy the change order if the denomination breakdown requested is available at the cash handling device, wherein reserving the cash includes editing information controlling which cash is; and sending an error message if the denomination breakdown requested is not available at the cash handling device.

17. The media of claim 16, wherein reserving the cash comprises:

editing a storage medium containing information controlling availability of cash at the cash handling device to ensure that the requested cash including the denomination breakdown is available to a user if the user retrieves the cash at the time slot.

* * * * *